(12) United States Patent
Trainor-Guitton et al.

(10) Patent No.: US 9,002,766 B2
(45) Date of Patent: Apr. 7, 2015

(54) SYSTEM AND METHOD FOR DETERMINING A VALUE OF INFORMATION METRIC FROM A POSTERIOR DISTRIBUTION GENERATED THROUGH STOCHASTIC INVERSION

(75) Inventors: Whitney Trainor-Guitton, Pleasanton, CA (US); Gary Michael Hoversten, Lafayette, CA (US)

(73) Assignees: Chevron U.S.A. Inc., San Ramon, CA (US); Lawrence Livermore National Security, LLC, Livermore, CA (US)

( * ) Notice: Subject to any disclaimer, the term of this patent is extended or adjusted under 35 U.S.C. 154(b) by 149 days.

(21) Appl. No.: 13/600,414

(22) Filed: Aug. 31, 2012

(65) Prior Publication Data
US 2014/0067744 A1    Mar. 6, 2014

(51) Int. Cl.
*G06F 17/00* (2006.01)
*G06N 5/02* (2006.01)
*E21B 41/00* (2006.01)
*G01V 99/00* (2009.01)
*G06N 7/00* (2006.01)

(52) U.S. Cl.
CPC ............. *G06N 5/02* (2013.01); *E21B 41/0092* (2013.01); *G01V 99/005* (2013.01); *G06N 7/005* (2013.01)

(58) Field of Classification Search
USPC ...................................................... 706/12, 45
See application file for complete search history.

(56) References Cited

U.S. PATENT DOCUMENTS

| | | | |
|---|---|---|---|
| 6,912,467 B2 | 6/2005 | Schuette | |
| 6,970,397 B2 | 11/2005 | Castagna et al. | |
| 7,254,091 B1 * | 8/2007 | Gunning et al. | 367/73 |
| 7,912,649 B2 | 3/2011 | Harris et al. | |
| 8,095,345 B2 | 1/2012 | Hoversten | |
| 2009/0164186 A1 | 6/2009 | Haase et al. | |
| 2009/0306899 A1 * | 12/2009 | Harris et al. | 702/13 |
| 2010/0185422 A1 * | 7/2010 | Hoversten | 703/2 |
| 2010/0325075 A1 | 12/2010 | Goel et al. | |
| 2011/0072206 A1 | 3/2011 | Ross et al. | |
| 2011/0172977 A1 | 7/2011 | Kolbjornsen et al. | |

(Continued)

FOREIGN PATENT DOCUMENTS

WO    2010151354 A1    12/2010

OTHER PUBLICATIONS

International Search Report dated Aug. 29, 2013 for Appln. No. PCT/US2013/057365.

(Continued)

*Primary Examiner* — David Vincent
(74) *Attorney, Agent, or Firm* — Pillsbury Winthrop Shaw Pittman, LLP (57) ABSTRACT

A system and a computer implemented method for determining a value of information are described herein. The method includes drawing a plurality of synthetic prior earth models from one or more prior distributions for a plurality of well locations and generate from each prior distribution synthetic data; and drawing a plurality of posterior earth models from a posterior distribution for the plurality of well locations, the posterior distribution being generated through stochastic inversion from the synthetic data and the plurality of posterior models are drawn from each of the plurality of prior earth models. The method further includes calculating a difference or a ratio between a weighted value prior and a weighted value posterior and calculating a sum over a plurality of well locations of the difference or the ratio to obtain the value of information.

24 Claims, 9 Drawing Sheets

(56) References Cited

U.S. PATENT DOCUMENTS

2012/0084007 A1 4/2012 Tran et al.
2012/0215511 A1 8/2012 Sarma et al.

OTHER PUBLICATIONS

Kjonsberg Mar. 31, 2010 Bayesian Monte Carlo method for seismic predrill prospect assessment.
Ramirez Sep. 27, 2004 Stochastic Inversion of Electrical Resistivity Changes Using a Markov Chain, Monte Carlo Approach.
Trainor-Guitton May 31, 2010 on the Value of Information for Spatial Problems in the Earth Sciences.
Earth Works Dec. 31, 2006 Understanding Stochastic Seismic Inversion Earthworks Environment & Resources Ltd.
Fu Jan. 30, 2009 Uncertainty assessment and data worth in groundwater flow and mass transport modeling using a blocking Markov chain Monte Carlo method.
Gunning Jul. 31, 2004 Delivery: an open-source model-based Bayesian seismic inversion program.
Guitton & Hoversten (2011) "Stochastic inversion for electromagnetic geophysics: Practical challenges and improving convergence efficiency," Geophysics 76, F373-F386.
Cumming, W. (2009) Geothermal Resource Conceptual Models Using Surface Exploration Data, Proceedings, Thirty-Fourth Workshop on Geothermal Reservoir Engineering, Stanford University, Stanford, California, Feb. 9-11, 2009.
Bratvold, R.B., Bickel, J.E., and Lohne, H.P. (2009) Value of information in the oil and gas industry: past, present, and future, Society of Petroleum Engineers Journal, SPE 110378.
Trainor-Guitton, W.J., Caers, J., & Mukerji, T. (2011) "A Methodology for Establishing a Data Reliability Measure for Value of Spatial Information Problems," Mathematical Geosciences. DOI 10.1007/s11004-011-9367-0.
Howard, R.A. (1966) Decision Analysis: Applied Decision Theory, Proceedings of the Fourth International Conference on Operational Research, Wiley-Interscience, pp. 55-71.
Howard, R.A. (1966) Information Value Theory. IEEE Transactions on Systems Science and Cybernetics, vol. SSC-2, No. 1, pp. 22-26.
Written Opinion of International Preliminary Examining Authority dated Dec. 22, 2014 for Appln. No. PCT/US2013/057356.

\* cited by examiner

FIG. 9

SYSTEM AND METHOD FOR DETERMINING A VALUE OF INFORMATION METRIC FROM A POSTERIOR DISTRIBUTION GENERATED THROUGH STOCHASTIC INVERSION

FIELD

The present invention pertains in general to computation methods and more particularly to a computer system and computer implemented method for determining a value of information metric from a posterior distribution generated through stochastic inversion.

BACKGROUND

The field of decision analysis provides a framework for making decisions with uncertain outcomes and provides a value of information (VOI) metric. VOI is a tool to determine whether purchasing a new information source would improve a decision-maker's chances of taking the optimal action. In other words, VOI provides the decision maker an estimate of how a particular information source can improve the probability of a successful outcome. For example, a typical decision is to determine a successful well-site given an interpretation of available geophysical properties around that site. Various geophysical properties may be used including electrical resistivity via a magneto-tellurics (MT) data inversion (in the geothermal field), seismic, gravity, and electromagnetic (in the oil and gas context). The geophysical properties (e.g., seismic) would provide estimates, through inversion, of velocity, density and electrical conductivity.

In order to calculate a VOI, a posterior distribution is calculated. However, none of the conventional methods employ stochastic inversion to obtain the posterior distribution or probabilities. Conventional methods use statistics that are acquired either subjectively or by using non-physics based statistical methods that are subjective in nature and are not related to the physics of the rock formation leading to a potentially erroneous estimate of a probability of well success.

Therefore, there is a need for a method or methods that cure these and other deficiencies in the conventional methods to provide a decision-risk method by moving from subjective assessment of risks to a quantitative approach where parameters calculated from stochastic inversion replace a decision maker's conjectures.

SUMMARY

An aspect of the present invention is to provide a computer implemented method for determining a value of information. The method includes drawing, by the computer, a plurality of synthetic prior earth models from one or more prior distributions for a plurality of well locations and generate from each prior distribution synthetic data; drawing, by the computer, a plurality of posterior earth models from a posterior distribution for the plurality of well locations, wherein the posterior distribution is generated through stochastic inversion from the synthetic data and the plurality of posterior models are drawn from each of the plurality of prior earth models; calculating, from the plurality of prior earth models and posterior earth models, a well production at a plurality of proposed well locations using a relationship between the earth parameters and the well production for both the prior earth models and the posterior earth models; calculating a prior well cost using a relationship between the prior well cost and the earth parameters and calculating a posterior well cost using a relationship between the posterior well cost and the earth parameters; calculating a value prior using the prior cost and the prior production and calculating a value posterior using the posterior cost and the posterior production; calculating a weighted prior value and calculating a weighted posterior value using, respectively, the value prior and the value posterior; and calculating a difference or a ratio between the weighted value prior and the weighted value posterior and calculating a sum over a plurality of well locations of the difference or the ratio to obtain the value of information.

Another aspect of the present invention is to provide a computer system for determining a value of information. The computer system includes a computer readable memory configured to store well locations and existing well data. The computer system further includes a processor in communication with the computer readable memory. The processor is configured to: (a) draw a plurality of synthetic prior earth models from one or more prior distributions for a plurality of well locations and generate from each prior distribution synthetic data; (b) draw a plurality of posterior earth models from a posterior distribution for the plurality of well locations, wherein the posterior distribution is generated through stochastic inversion from the synthetic data and the plurality of posterior models are drawn from each of the plurality of prior earth models; (c) calculate, from the plurality of prior earth models and posterior earth models, a well production at a plurality of proposed well locations using a relationship between the earth parameters and the well production for both the prior earth models and the posterior earth models; (d) calculate a prior well cost using a relationship between the prior well cost and the earth parameters and calculate a posterior well cost using a relationship between the posterior well cost and the earth parameters; (e) calculate a value prior using the prior cost and the prior production and calculate a value posterior using the posterior cost and the posterior production; (f) calculate a weighted prior value and calculate a weighted posterior value using, respectively, the value prior and the value posterior; and (g) calculate a difference or a ratio between the weighted value prior and the weighted value posterior and calculate a sum over a plurality of well locations of the difference or the ratio to obtain the value of information.

Although the various steps of the method according to one embodiment of the invention are described in the above paragraphs as occurring in a certain order, the present application is not bound by the order in which the various steps occur. In fact, in alternative embodiments, the various steps can be executed in an order different from the order described above or otherwise herein.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

In one embodiment, posterior analysis can be used to determine a well location with a highest possible outcome. That is posterior analysis can be used to determine which well-site x has a highest probability of success given an interpretation of available earth properties. Earth properties can be expressed as a vector of earth parameters $\rho$. In the following paragraphs, for illustration purposes, it may be referred to a specific example of earth property. However, as it can be appreciated, the vector $\rho$ can include any number of earth parameters including, but not limited to, electrical resistivity, velocity, permeability, density, porosity, etc.

Figure 1:
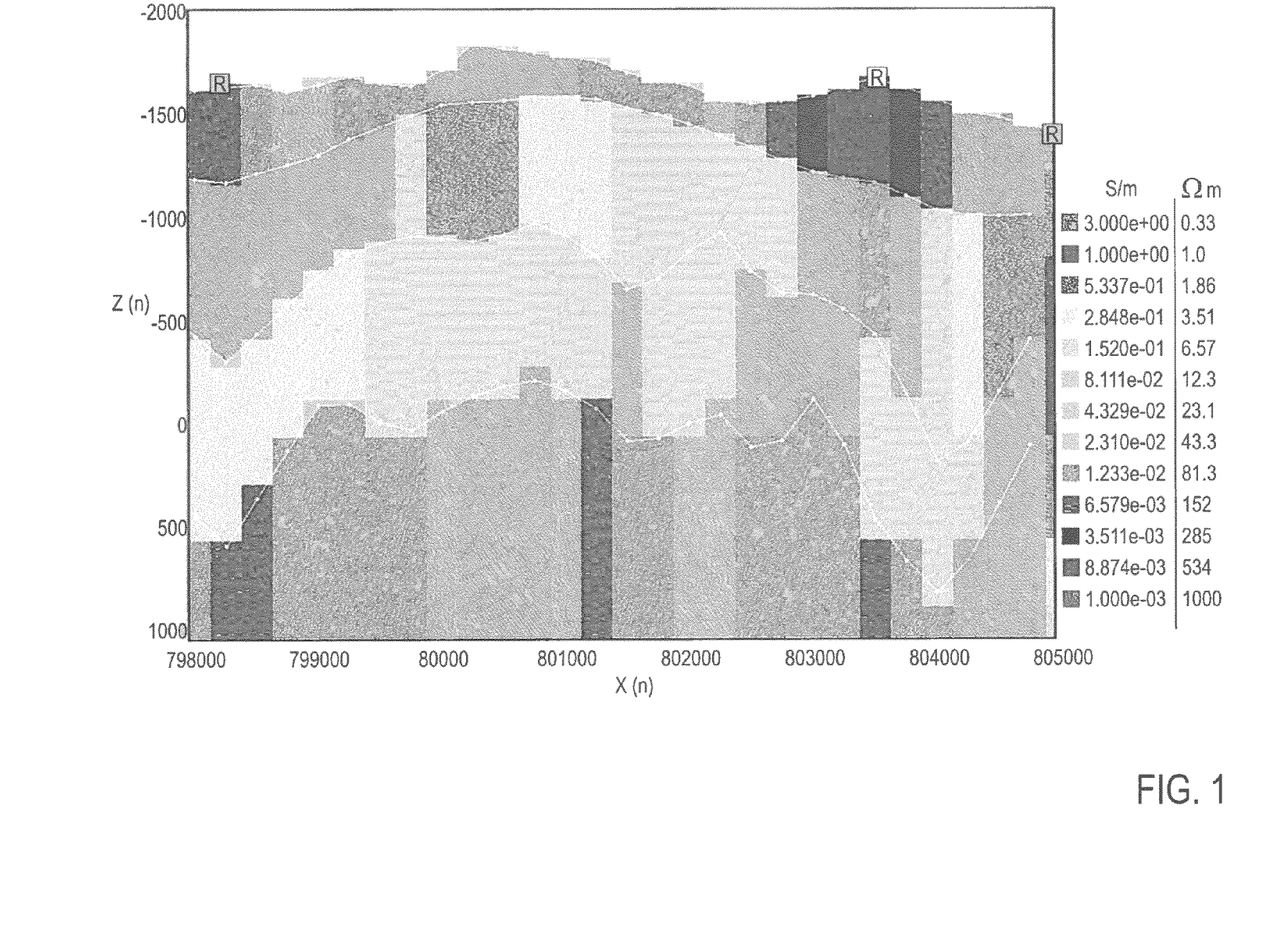
FIG. 1 is an example of a depth section through a three dimensional earth model for a geothermal field derived by stochastic inversion of Magnetotelluric data, according to an embodiment of the present invention.

FIG. 1 is an example of a depth section through a three dimensional earth model for a geothermal field derived by stochastic inversion of magnetotelluric data, according to an embodiment of the present invention. In this case, the earth parameters $\rho$ are layer electrical resistivity and depth to the top of a layer at three-dimensional positions defined by position vector x. At each location x in the model, the posterior $Pr(\rho|d,I)$ defines a distribution for the earth parameter $\rho$ at location x. The abscissa axis represents the position x. The ordinate axis represents the depth of z of a rock layer. The term d represents the geophysical data and the term I represents the prior information which can be geological, geophysical, or geochemical, etc., or any combination thereof. Therefore, the posterior distribution $Pr(\rho|d,I)$ provides the posterior probability distribution of an earth parameter $\rho$ conditional on evidence obtained from a geophysical data d.

FIG. 1 shows four different layers. The earth parameter (e.g., the electrical resistivity in $\Omega m$, for example) is represented by a graying-scale. A chart is provided on the right side of FIG. 1 providing a corresponding electrical resistivity to the gray bars in FIG. 1. As shown in FIG. 1, each layer has a variable electrical resistivity shown as different gray-scaled bars. Layer boundaries are shown by dotted lines. The values of electrical resistivity and layer depth plotted in FIG. 1 are median values of the posterior distribution $Pr(\rho|d,I)$, derived by a stochastic inversion of magnetotelluric data taken over a geothermal field. In this example, at each x position, there are four different electrical resistivity values and three depth values in the earth model.

Figure 2A:
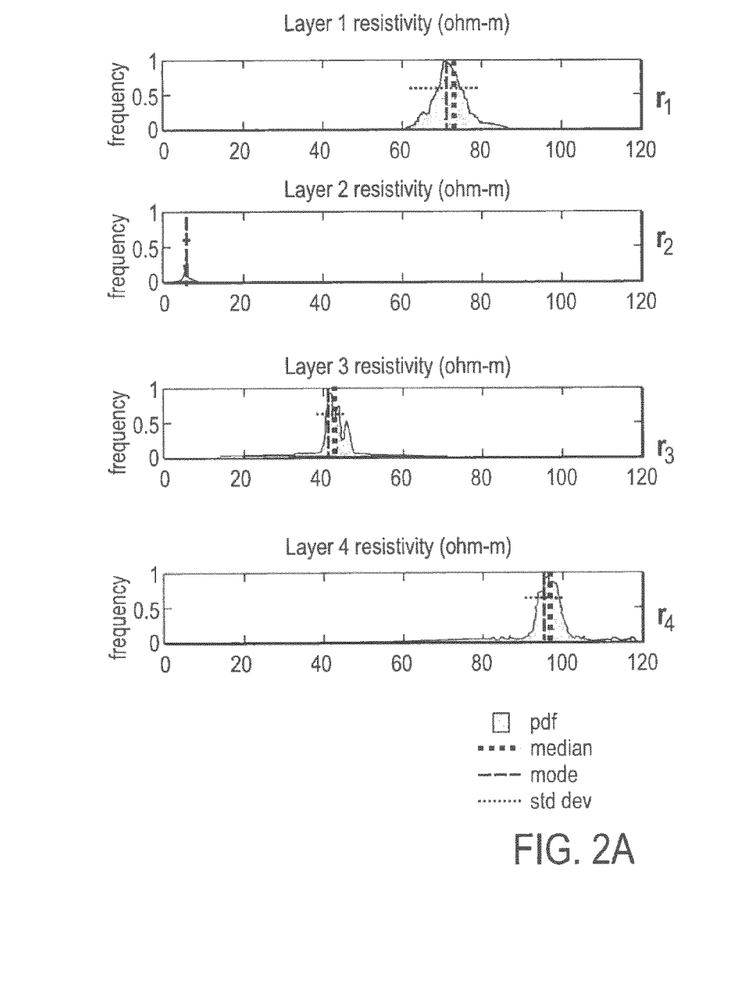
FIG. 2A shows an example of posterior distributions $Pr(\rho|d,I)$ of the earth parameter $\rho$ (electrical resistivity in $\Omega m$) at one location x of the earth shown in FIG. 1.

FIG. 2A shows an example of posterior distributions $Pr(\rho|d,I)$ of the earth parameter $\rho$ (electrical resistivity in $\Omega m$) at one location x of the earth shown in FIG. 1. At each location x in the earth model there are four resistivities r1, r2, r3 and r4. The abscissa axis of the histogram represents the electrical resistivity and the ordinate axis of the histogram represents the frequency. A distribution of the electrical resistivity of each layer of the 4 layers is plotted. The median, standard deviation and mode values are also provided. For example, the first layer (layer 1) has a distribution centered around 70 $\Omega m$, corresponding to electrical resistivity r1, the second layer (layer 2) has a distribution centered around 5 $\mu m$, corresponding to electrical resistivity r2, the third layer (layer 3) has a distribution centered around 40 $\Omega m$, corresponding to electrical resistivity r3, and the fourth layer has a distribution centered around 95 $\Omega m$, corresponding to electrical resistivity r4.

Figure 2B:
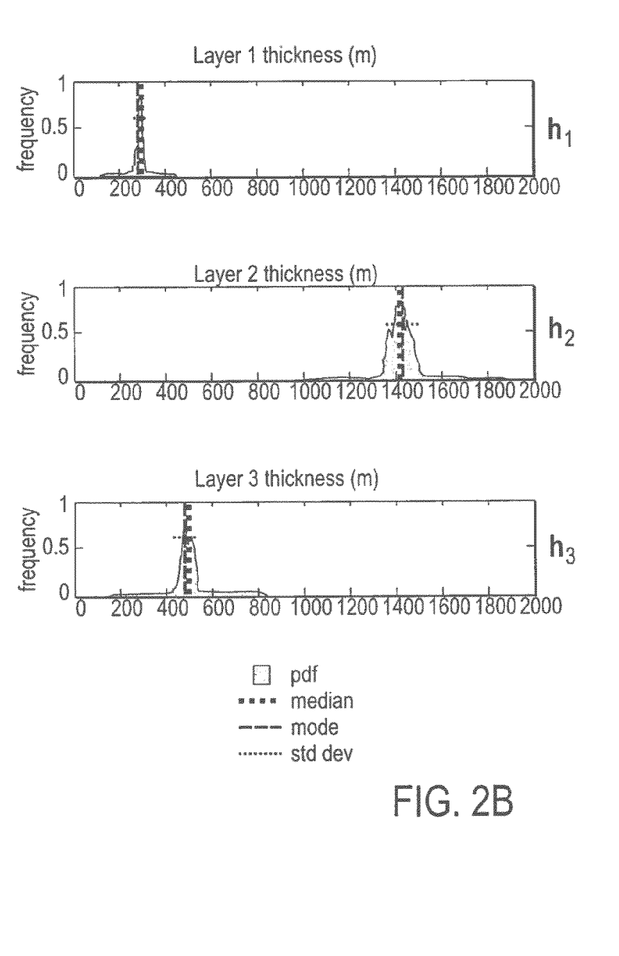
FIG. 2B shows an example of the posterior distributions $Pr(\rho|d,I)$ of the earth parameter thickness of layer h at one location x of the earth shown in FIG. 1.

FIG. 2B shows an example of the posterior distributions $Pr(\rho|d,I)$ of the earth parameter thickness of layer h at one location x of the earth shown in FIG. 1. The layer thickness is plotted on the abscissa axis and the ordinate axis of the histogram represents the frequency. A distribution of the thickness of each of the 4 layers is plotted. For example, the first layer (layer 1) has a distribution centered around 300, corresponding to thickness h1, the second layer (layer 2) has a distribution centered around 1400, corresponding to thickness h2, the third layer (layer 3) has a distribution centered around 500, corresponding to thickness h3.

The posterior distribution Pr(ρ|d,I) can be used to generate any number N realizations of the earth by randomly drawing from the earth model parameter distributions, illustrated in FIGS. 2A and 2B.

Figure 3:
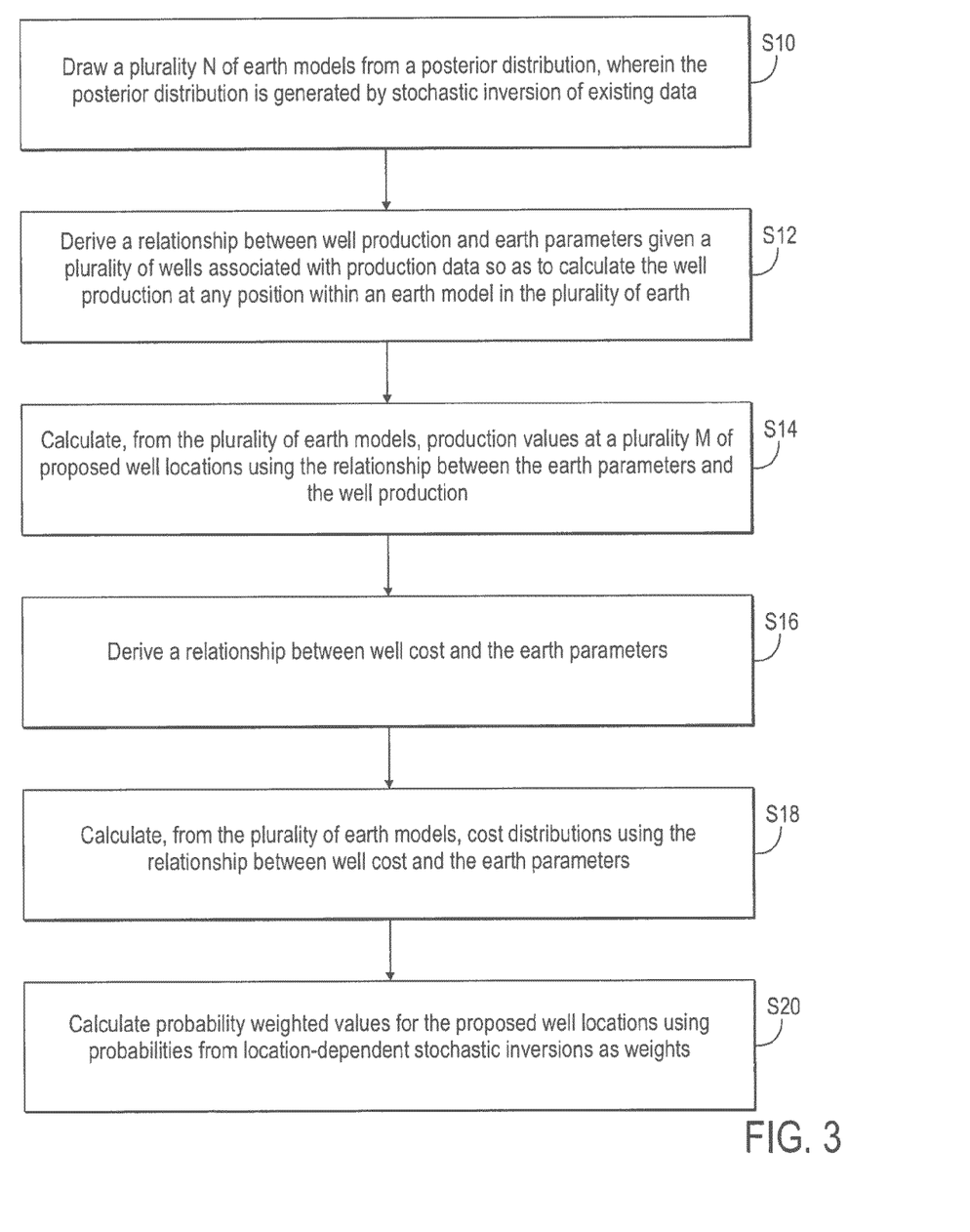
FIG. 3 is flow diagram of a method for determining a best well location from a number M of possible well locations, according to an embodiment of the present invention.

FIG. 3 is a flow diagram of a method for determining a best well location from a number M of possible well locations, according to an embodiment of the present invention. The method starts by drawing N earth models from the posterior distribution Pr(ρ|d,I), where the posterior is generated by stochastic inversion of existing data, at S10. The posterior distribution Pr(ρ|d,I) can be generated by any stochastic inversion technique. For example, in one embodiment, Markov Chain Monte Carlo (MCMC) techniques which evaluate the likelihood of any Earth model associated with vector of earth parameters ρ given some observed data d can be used. A description of stochastic inversion can be found in Trainor-Guitton & Hoversten (2011) "*Stochastic inversion for electromagnetic geophysics: Practical challenges and improving convergence efficiency,*" Geophysics 76, F373-F386. In general terms, stochastic inversion corresponds to the likelihood function $f(d|ρ^c)$ which describes the probability of candidate model $ρ^c$ to occur given the observed data d. In one embodiment, the likelihood function $f(d|ρ^c)$ can be expressed by the following equation (1). Other definitions of likelihood functions will result, if different assumptions about the nature of the error model are made.

$$f(d \mid \rho^c) = \prod_{i=1}^{nData} \frac{1}{\sqrt{2\pi\beta_i^2}} \exp\left\{-\frac{1}{2\beta_i^2}\left(\frac{d_i - C(\rho^c)}{d_i}\right)^2\right\} \tag{1}$$

Embedded in this exponential function is the misfit between the observed data d and the calculated data C. Therefore, Pr(ρ|d,I) represents a suite of candidate models and their respective probabilities generated through the likelihood of equation (1).

As stated in the previous paragraphs ρ can be any parameterization of the earth (porosity, permeability, velocity, density, electrical resistivity, etc.). However, for the sake of illustration, we consider the case where ρ includes electrical resistivity and depths to layer tops. The data vector d could be any data that can be used to infer earth model parameters, for example, seismic, magnetotellurics, controlled source EM, production data from wells, geochemical, geological, etc. The symbol I represents the prior information about earth parameters ρ. The prior can be simple bounds on possible earth model parameters ρ. Alternatively, the prior can also be a preferred set of the model parameters or distinct probability distributions of the earth model parameters ρ. At every proposed well location x, there is an associated model posterior, as illustrated for example in FIGS. 2A and 2B. In addition, the probability of existence of any earth model parameter $ρ_i$ can be calculated using Pr(ρ|d,I).

The method further includes deriving a relationship between earth parameters ρ and a well production q, given P existing wells associated with production data, and inputting the relationship, at S12. The relationship can be expressed by the following equation (2).

$$q(x) = f(\rho(x)) \tag{2}$$

where x=1, 2, ..., P, where P is the number of existing wells.

Equation (2) allows production q to be calculated at any position x within an earth model realization ρ. Production q is a quantitative scalar and can be in many different units depending on the specifics of the problem. For example, production q can be expressed in fluid volume, BTU per unit time, or expressed in revenue (currency such as dollar amount). The relationship expressed in Equation (2), can be derived from existing co-located production data and the Earth properties represented in ρ. For example, electrical resistivity models could be calibrated with the resulting production data that is observed at that location. Equation (2) can be a simple regression or a probabilistic relationship based on all data for a reservoir with no spatial dependence. However, if sufficient production data exists, f(ρ(x)) can be spatially dependent. The development of equation (2) can be done either in the same reservoir area where the decisions are to be made or outside the area where the decisions are to be made. Hence, the P wells used can be from another field or area as long as there is reason to believe they are representative of the relationship that will hold between ρ(x) and q in the area of interest.

The method further includes calculating, from N realizations of the earth model $ρ_i$ (i=1, ..., N), production values at the M proposed well locations using equation (2), at S14.

The method further comprises deriving a relationship between well cost and earth parameters ρ, and inputting the relationship, at S16. This relationship may originate from work to date on the area under consideration or from a data base from previous experience or set of previous measurements. In a simplest case, the relationship would only depend on the depth parameters in ρ since to a first order approximation, the cost of a well cost(x) is directly related to the depth of the well. However, the relationship can also take into account the spatial variability of the hardness of the rock, for example. The relationship can be expressed as the function g(ρ) in equation (3) below. Similar to the production function, the cost function can be a simple regression or a probabilistic distribution function.

$$\text{cost}(x) = g(\rho) \tag{3}$$

The method also includes calculating cost distributions using equation (3), i.e., the relationship between well cost and the earth parameters, at S18. The method also includes calculating a production-cost ratio or value at well position x, using the following equation (4).

$$\text{value}_i(x) = \frac{q_i(x)}{\text{cost}_i(x)} \tag{4}$$

where x is equal to 1, 2, ..., M, where M is number of wells and x is the well location.

The ratio or value is useful as it allows flexibility in the units of production and cost. The ratio is utilized for the risk-cost distribution for decision analysis.

The method further includes calculating the probability-weighed values or risk-weighed values V(x) for all the considered M well locations, at S20. An expected value (e.g., average value) V(x) of any proposed well location x can be calculated for all the considered M well locations by using probabilities from location-dependent stochastic inversions $\text{Pr}(\rho_1|d_1,I)$ as weights. The probability weighed values can be expressed by the following equation (5).

$$V(x) = \sum_{i=1}^{N} Pr(\rho_1 | d_1, I) value_i(x) \quad (5)$$

where $x=1, 2, \ldots, M$, M being the number of wells.

Therefore, calculating the probability weighted values $V(x)$ for the proposed well locations x includes calculating a production-cost value $value_i(x)$ at a given well location x, multiplying the production-cost value $value_i(x)$ by the posterior distribution $\rho_1|d_1,I)$ obtained from the stochastic inversion to obtain weighed production-cost values, and summing the weighed production-cost values over the plurality of posterior earth models (1 ... N).

The probability-weighed values $V(x)$ at the M possible locations can be compared to each other to determine the most valuable location. The most valuable location corresponds to the location with the maximum value of $V(x)$. This can be expressed by the following relationship (6).

Best well location $x$ (among $M$ well locations)=$\text{Max}_x V(x)$ \quad (6)

In one embodiment, a number of model realizations N is chosen such that the mean and variance of $V(x)$ asymptote to constant values as N increases.

Figure 4:
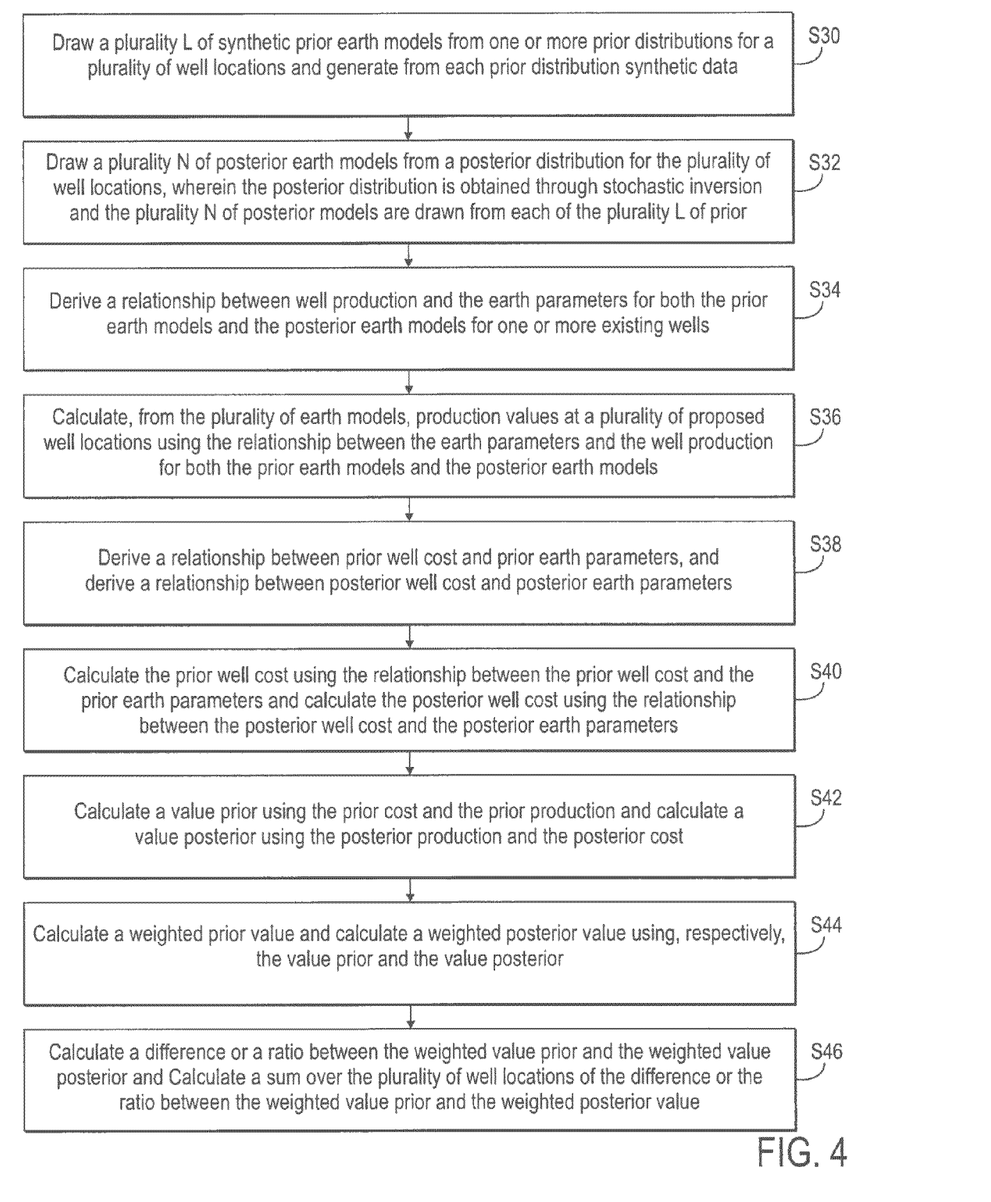
FIG. 4 is a flow chart of the method for determining a Value of Information (VOI), according to an embodiment of the present invention.

An aspect of the present invention is to provide a method for determining a Value of Information (VOI) using posterior analysis. VOI provides a decision maker an estimate of how a particular information source can improve the probability of a successful outcome. FIG. 4 is a flow chart of the method for determining the VOI, according to an embodiment of the present invention. The method for determining VOI repeats the steps S10 through S20 described above with respect to FIG. 3 with the exception that the initial step S30 uses simulated data from synthetic earth models instead of using the posterior generated by stochastic inversion of existing data. In this embodiment, the synthetic earth models are drawn from one or more prior distribution(s) $\text{Pr}(\rho|I)$. In this case $\text{Pr}(\rho|I)$ represents the best estimate(s) of the geologic model based on all available information. The method provides the value of acquiring geophysical data.

The method for determining VOI includes creating or drawing L prior earth models $\rho_j^{prior}$ from the prior distribution $\text{Pr}(\rho|I)$ for M well locations ($x=1, 2, \ldots, M$), and generating, from each prior model, synthetic data, at S30.

The Drawing from the prior $\text{Pr}(\rho|I)$ does not require stochastic inversion. The drawing simply uses a Monte Carlo draw from the statistical representation of the prior uncertainty. For example, the statistical representation can be a histogram of a particular property (e.g., electrical resistivity and the layer boundaries). Alternatively, the statistical representation can be based on the generation of geostatistical realizations using a variogram or training image. The prior distribution differs from the posterior distribution in that the prior distribution is not informed by any geophysical, geochemical or production data d.

The method further includes drawing N Earth models $\rho_i$ from the posterior $\text{Pr}(\rho|d,I)$ for M well locations ($x=1, 2, \ldots, M$), at S32. In one embodiment, the posterior distribution is obtained through stochastic inversion. In one embodiment, this is performed by simulating the physics of the measurement for every prior synthetic earth model considered $\rho_j^{prior}$, and then inverting the synthetic data for the earth properties $\rho_i(x,j)$. In one embodiment, the method includes drawing N posterior models from each prior model. In this notation of posterior earth properties $\rho_i(x,j)$, the index j denotes a prior model from which the posterior model originates.

The method further includes performing the same steps as in the method described with respect to FIG. 3. That is, perform the same steps for both the prior models to obtain $q_j^{prior}(x)$ and the posterior models to obtain $q_i(x,j)$. The index j represents the prior earth model index and the index i represents the posterior earth model index. The index j varies from 1 to L, L being a number of synthetic prior earth models. The index i varies from 1 to N, N being the number of posterior earth models.

This includes deriving relationships between a well production q and earth parameters $\rho$ for both the prior earth models and the posterior earth models, given P existing wells (one or more wells) associated with production data, and inputting the relationships at S34. The relationships can be expressed by the following equations (7) and (8). Equations (7) and (8) provide, respectively, the prior production and the posterior production.

$$q_j^{prior}(x)=f(\rho_j^{prior}(x)) \quad (7)$$

$$q_i(x,j)=f(\rho_i(x,j)) \quad (8)$$

where $x=1, 2, \ldots, P$, where P is the number of existing wells.

The method includes calculating, from the earth models, production values at the proposed well locations using the relationship between the earth parameters and the well production for both the prior earth models $\rho_j^{prior}$ and the posterior earth models $\rho_i(x,j)$ (where, i=1 ... N and j=1 ... L, at S36. Equations (7) and (8) allow production q to be calculated at any position x within an earth model realization $\rho$. The relationship expressed in Equations (7) and (8), can be derived from existing co-located production data and the Earth properties represented in $\rho$. For example, electrical resistivity models could be calibrated with the resulting production data that is observed at that location. Equations (7) and (8) can be regressions or probabilistic relationships based on all data for a reservoir without spatial dependence.

Similar to the method described above with respect to FIG. 3, the present method for determining VOI further comprises deriving a relationship between prior well cost and prior earth parameters $\rho_j^{prior}$ and a relationship between posterior well cost and posterior earth parameters $\rho_i(x,j)$, and inputting the relationships, at S38. The relationships may originate from work to date on the area under consideration or from a data base from previous experience or set of previous measurements. Similarly, in a simplest case, the relationships would only depend on the depth parameters in $\rho$ since to a first order approximation, the cost of a well cost(x) (i.e., prior well cost and posterior well cost) is directly related to the depth of the well. However, the relationship can also take into account the spatial variability of the hardness of the rock, for example. The relationship can be expressed as the function $g(\rho)$ in equations (9) and (10) below. Equations (9) and (10) provide, respectively, the prior well cost "$\text{cost}_j^{prior}(x)$" and the posterior well cost "$\text{cost}_i(x,j)$".

$$\text{cost}_j^{prior}(x)=g(\rho_j^{prior}) \quad (9)$$

$$\text{cost}_i(x,j)=g(\rho_i(x,j)) \quad (10)$$

The method also includes calculating prior well cost distributions and posterior well cost distributions using equation (9) and (10), respectively, at S40. The method also includes calculating a prior value and a posterior value at well position x, using the following equation (11) or equation (12) at S42. Equation (11) and (12) provide, respectively, the value prior and the value posterior.

$$value_j^{prior}(x) = \frac{q_j^{prior}(x)}{cost_j^{prior}} = \frac{f(\rho_j^{prior}(x))}{g(\rho_j^{prior})} \quad (11)$$

$$value_i(x, j) = \frac{q_i(x, j)}{cost_i(x, j)} = \frac{f(\rho_i(x, j))}{g(\rho_i(x, j))} \quad (12)$$

where x is equal to 1, 2, ..., M, where M is number of wells and x is the well location.

The ratio or value is useful as it allows flexibility in the units of production and cost. The ratio is utilized for the risk-cost distribution for decision analysis.

The method for determining VOI further includes calculating a difference or a ratio between a weighted value posterior $V^{Posterior}$ and a weighted value prior $V^{Prior}$, for all earth models at one location. In one embodiment, the weighted value prior $V^{Prior}$ for all earth models at one location is calculated using the following equation (13).

$$V^{Prior}(x) = \max[(\Sigma_{j=1}^{L} Pr(\rho_j^{prior}(x)|I)value_j^{prior}(x)), 0] \quad (13)$$

The two values within the max function represent the two decision actions: drilling a well or doing nothing. The value 0 at the end of equation (13) signifies that no action is taken (no drilling) therefore no cost nor value. The summation represents the weighted average (or expectation) of all the possible drawn values from the prior. The max signifies that the best outcome, given no further information, is the best outcome on average between the actions of doing nothing or drilling at that location x.

In one embodiment, the weighted value posterior $V^{Posterior}$ for all earth models at one location is also calculated using the following equation (14).

$$V^{Posterior}(x) = \sum_{j=1}^{L} Pr(\rho_j^{prior}(x) \mid I) \quad (14)$$
$$\max\left[\sum_{i=1}^{N} Pr(\rho_i(x, j) \mid d(x, j), I)value_i(x, j)), 0\right]$$

Compared to equation (13) which provides $V^{Prior}$, equation (14) has an additional expectation represented by the product in the inner summation. This accounts for the uncertainty of the information. The max operation is now inside the outer summation. This is because chronologically the decision maker will have the data d(x, j) before the decision is made.

The method further includes calculating a difference or a ratio between the weighted prior value and the weighted posterior value and calculating a sum over the plurality of well locations of the difference or the ratio between the weighted prior value and the weighted posterior value, at S46.

In one embodiment, the method includes calculating the VOI by summing over all possible M well locations, as expressed in the following equation (15), at S44.

$$VOI = \sum_{x=1}^{M} (V^{Posterior}(x) - V^{Prior}(x)) \quad (15)$$

Although a difference operation between the weighted posterior value $V^{Posterior}$ and the weighted prior value $V^{Prior}$ is used inside the summation in equation (15) to calculate the VOI, it is also contemplated to calculate the VOI using a ratio between the $V^{Prior}$ and $V^{Posterior}$ as provided in the following equation (16), at S44.

$$VOI = \sum_{x=1}^{M} \left(\frac{V^{Posterior}(x)}{V^{Prior}(x)}\right) \quad (16)$$

Since value is a metric of success for a decision outcome, the VOI equation describes how an information source can increase the chances of making a decision with a higher valued outcome.

Table I summarizes the various mathematical notations used for various parameters and variables in the above description. As it can be appreciated, although a specific mathematical notation is used in the above paragraphs, other mathematical notations can also be used.

TABLE I

| | |
|---|---|
| Vector of Earth Parameters | ρ |
| Vector of Geophysical Data | d |
| Prior Information (Geological, Geophysical, Geochemical, etc) | I |
| Posterior Distribution | Pr(ρ \| d, I) |
| Prior Distribution | Pr(ρ \| I) |
| Posterior Earth model index | i |
| Total number of Posterior Earth models | N |
| Well Location index | x |
| Number of Wells | M |
| Production | q |
| Cost of Production | cost |
| Prior Earth model index | j |
| Total number of Prior Earth models | L |

Figure 5A:
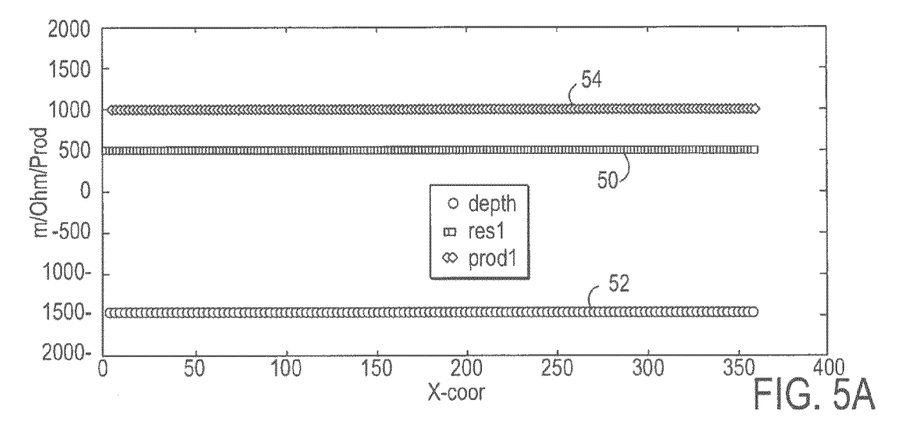
FIG. 5A is a graph representing an example first earth model which has a first electrical resistivity across all x locations (x-coordinate) at a constant depth, and an associated first production.

In the following paragraphs, two examples are described using the above described methods. In the first example, two-dimensional earth models are considered. FIG. 5A is a graph representing the first earth model ρ1 which has a first electrical resistivity 50 of 500 ohm-m across all x locations (x-coordinate) at a constant depth 52 of 1500 m (on the y-coordinate). The associated first production is also indicated in the graph at 54. In this example, the first production is equal to 1000. In this example, the first resistivity of 500 ohm-m results in a first production equal to 1000, as described in the above paragraphs with reference to equation (2).

Figure 5B:
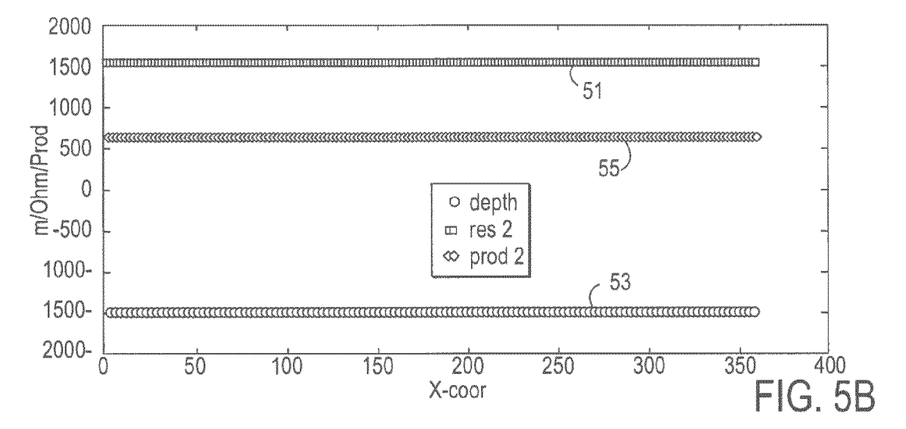
FIG. 5B is a graph representing an example second earth model having a higher second electrical resistivity at the same depth as the first earth model, and an associated second production.

FIG. 5B is a graph representing a second earth model ρ2 having a higher second electrical resistivity 51 of 1500 ohm-m at the same depth 53 of 1500 m as the first earth model ρ1. The associated second production is also indicated in the graph at 55. In this example, the second production 55 is equal to 600. In this example, the second resistivity 51 of 1500 ohm-m results in a second production 55 equal to 600, as described in the above paragraphs with reference to equation (2).

Figure 5C:
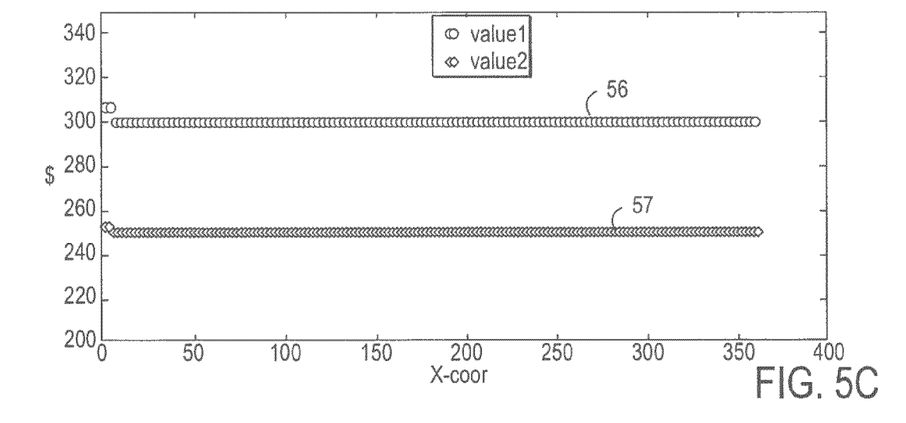
FIG. 5C is a graph showing a plot of a first production value as a function the x-coordinate and a plot of a second production value as a function of the x-coordinate.

FIG. 5C is a graph showing a plot of a first production value 56 as a function the x-coordinate and a plot of a second production value 57 as a function of the x-coordinate. The first production 54 of 1000 (first model) provides a first production value 56 of 300, and the second production 55 of 600 (second model) provides a second production value 57 of 250, as described above with respect to equation (4). Therefore, a lower electrical resistivity results in a higher production, and thus a higher production value.

However, the resistivity structure of the earth is unknown, and the information that is used to decipher the resistivity is uncertain. However, the distributions of possible electrical resistivity values at each location x or x-coordinate can be obtained through stochastic inversion. The distributions of possible electrical resistivity values is represented as Pr($\rho$|d, I). As described in the above paragraphs with respect to equations (2), (3) and (4), the distributions of electrical resistivity can be translated into distribution of value (e.g., monetary value).

Figure 6A:
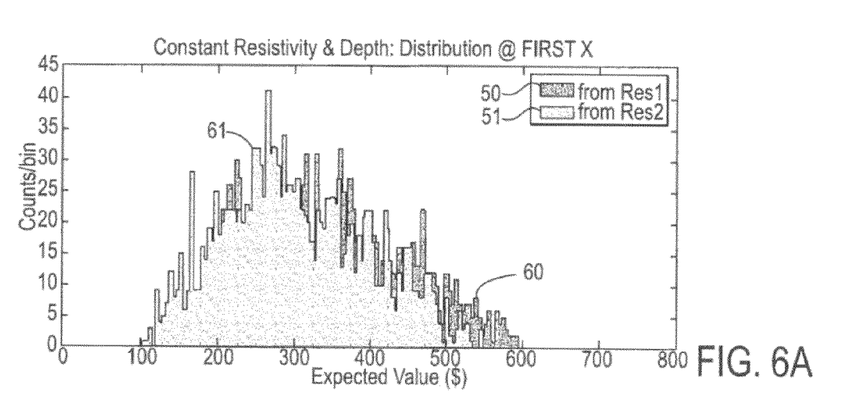
FIG. 6A is a graph of a first distribution of value (e.g., U.S. dollars) associated with the first electrical resistivity and depth and a second distribution of value associated with the constant second electrical resistivity and depth, at a first position.

FIG. 6A is a graph of a first distribution 60 of value (e.g., U.S. dollars) associated with the constant first electrical resistivity 50 and depth 52 and a second distribution 61 of value associated with the constant second electrical resistivity 51 and depth 53, at a first position (e.g., first position x at 1).

Figure 6B:
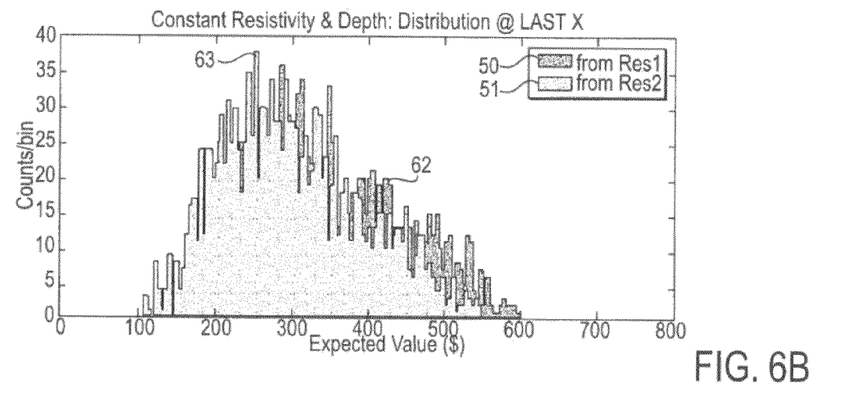
FIG. 6B is a graph of a first distribution of value associated with the constant first electrical resistivity and depth and a second distribution of value associated with the constant second electrical resistivity and depth, at a second position.
Figure 6C:
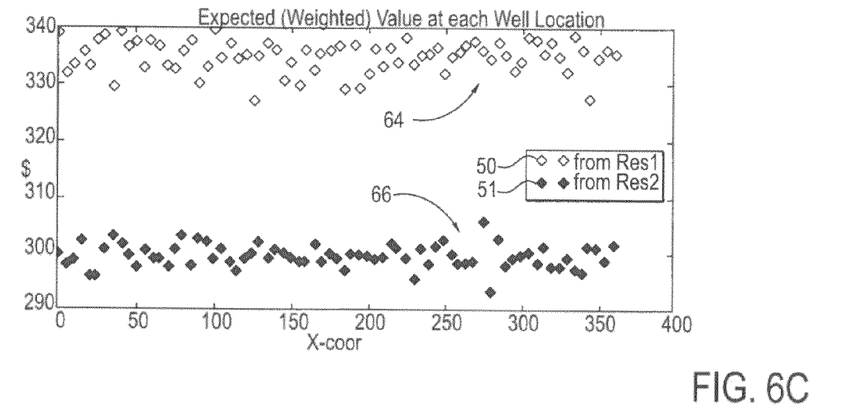
FIG. 6C shows a plot of the expected weighed value for each x location obtained for the first electrical resistivity, and a plot of the expected weighed value for each x location obtained for the second electrical resistivity.

FIG. 6B is a graph of a first distribution 62 of value associated with the constant first electrical resistivity 50 and depth 52 and a second distribution 63 of value associated with the constant second electrical resistivity 51 and depth 53, at a second position (e.g., last position x at 361). These two distribution are drawn for 1500 samples (i=1500). However, any number of samples can be implemented. FIG. 6C shows a plot of the expected weighed value 64 for each x location obtained for the first electrical resistivity 50, and a plot of the expected weighed value 66 for each x location obtained for the second electrical resistivity 51, using equation (5). The two plots 64 and 66 show that the weighed values for the second electrical resistivity 51 are less than the weighed values of the first electrical resistivity 50, across all x locations.

In a second example, two more complicated earth models are considered. In these earth models, both the depths of the earth layers and electrical resistivities vary across the x locations.

Figure 7A:
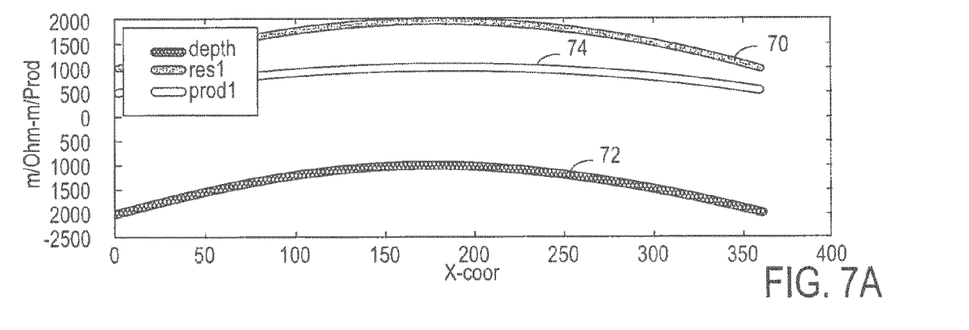
FIG. 7A is a graph representing a first earth model where there are plotted a first electrical resistivity across all x locations, a first depth across all x locations, and a first production across all x locations.
Figure 7B:
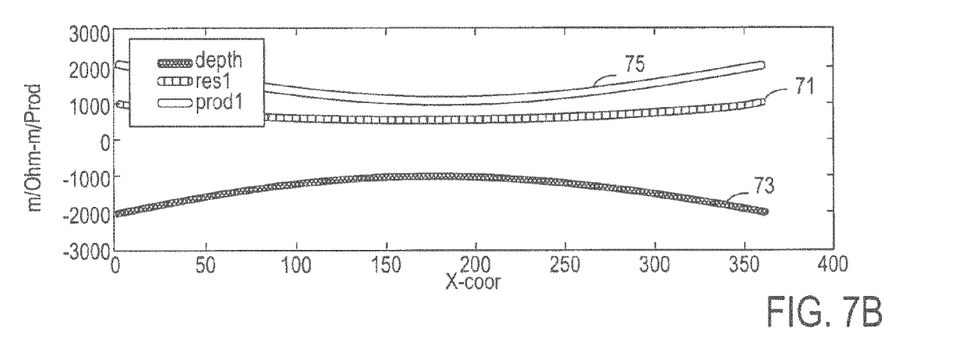
FIG. 7B is a graph representing a second earth model where there are plotted a second electrical resistivity across all x locations, a second depth across all x locations, and a second production across all x locations.

FIG. 7A is a graph representing a first earth model $\rho 1$ where there are plotted a first electrical resistivity 70 across all x locations (x-coordinate), a first depth 72 across all x locations, and a first production 74 across all x locations. The first production 74 is obtained using equation (2) described in the above paragraphs FIG. 7B is a graph representing a second earth model $\rho 2$ where there are plotted a second electrical resistivity 71 across all x locations (x-coordinate), a second depth 73 across all x locations, and a second production 75 across all x locations. The second production 75 is also obtained using equation (2) described in the above paragraphs.

As it can be noted in FIG. 7A, the curve of the first electrical resistivity 70 has a peak or maximum of at around the center x location. On the other hand, as can be noted in FIG. 7B, the curve of the second electrical resistivity 71 has a trough or minimum of at around the center x location.

Figure 7C:
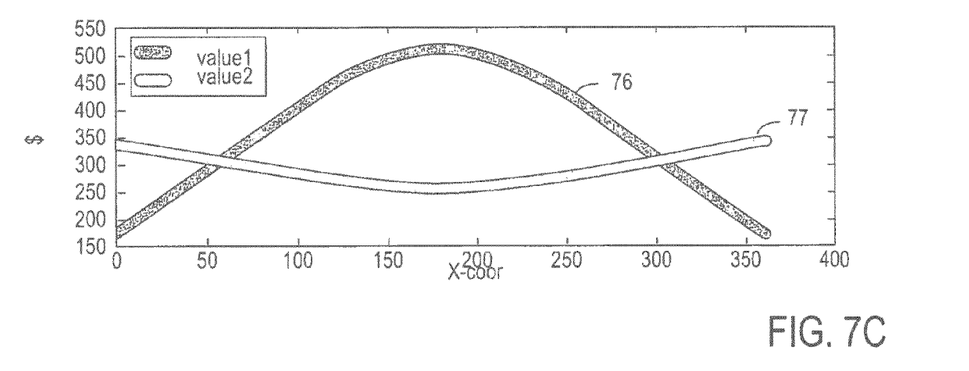
FIG. 7C is a graph showing a plot of a first production value as a function the x-coordinate and a plot of a second production value as a function of the x-coordinate.

FIG. 7C is a graph showing a plot of a first production value 76 as a function the x-coordinate and a plot of a second production value 77 as a function of the x-coordinate. The first production value 76 is obtained using the first earth model's first depth 72 and first electrical resistivity 70 and the second production value 77 is obtained using the second earth model's second depth 73 and second electrical resistivity 71, as explained in detail with respect to equations (3) and (4) which express the dependence of a cost of producing a resource as a function of a location.

As stated above, the resistivity structure of the earth is unknown, and the information that is used to decipher the electrical resistivity is uncertain. However, through stochastic inversion, distributions of possible resistivity values at each location x or x-coordinate can be obtained. The distributions of possible resistivity values is represented as Pr($\rho$|d,I). As described in the above paragraphs with respect to equations (2), (3) and (4), the distributions of resistivity can be translated into distributions of value.

Figure 8A:
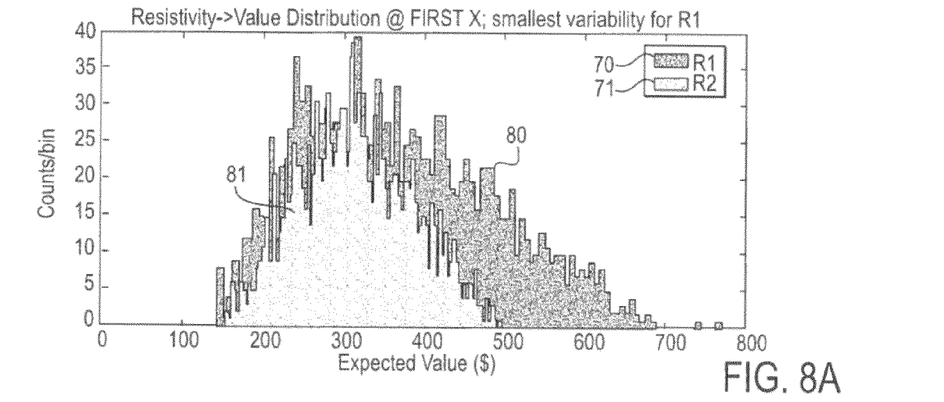
FIG. 8A is a graph of a first distribution of value (e.g., U.S. dollars) associated with the first electrical resistivity and depth and a second distribution of value associated with the second electrical resistivity and depth, at a first position.

FIG. 8A is a graph of a first distribution 80 of value (e.g., U.S. dollars) associated with the first electrical resistivity 70 and depth 72 and a second distribution 81 of value associated with the second electrical resistivity 71 and depth 73, at a first position (e.g., first position x at 1). FIG. 8A shows that electrical resistivity displays a relatively smaller variability as the distribution of value associated with the first electrical resistivity and the distribution of value associated with the second electrical resistivity present maxima at almost the same value (around approximately 300). In addition, it can be noted that the distribution of value is somewhat broader in the case of the first electrical resistivity but the two distributions have generally the same shape.

Figure 8B:
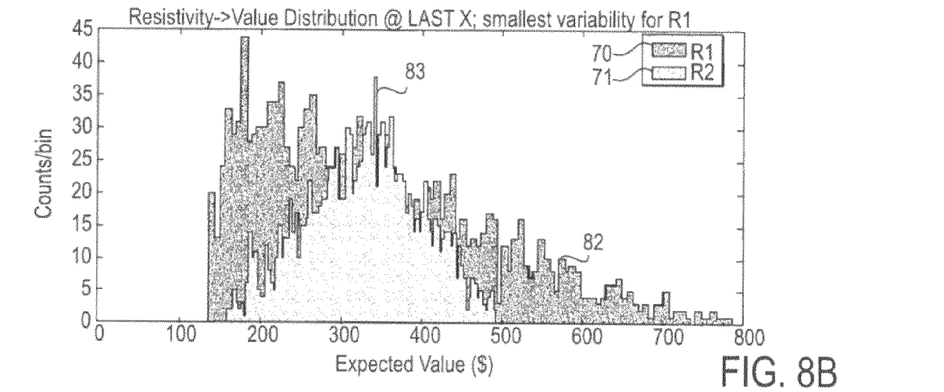
FIG. 8B is a graph of a first distribution of value associated with the first electrical resistivity and depth and a second distribution of value associated with the second electrical resistivity and depth, at a second position.

FIG. 8B is a graph of a first distribution 82 of value associated with the first electrical resistivity 70 and depth 72 and a second distribution 83 of value associated with the second electrical resistivity 71 and depth 73, at a second position (e.g., last position x at 361). FIG. 8B shows that the electrical resistivity displays a relatively higher variability as the distribution of value associated with the first electrical resistivity and the distribution of value associated with the second electrical resistivity present maxima at different values, respectively 150 and about 350. In addition, it can be noted that the distribution of value is broader in the case of the first electrical resistivity and the general shape of the first and second value distributions are different.

Figure 8C:
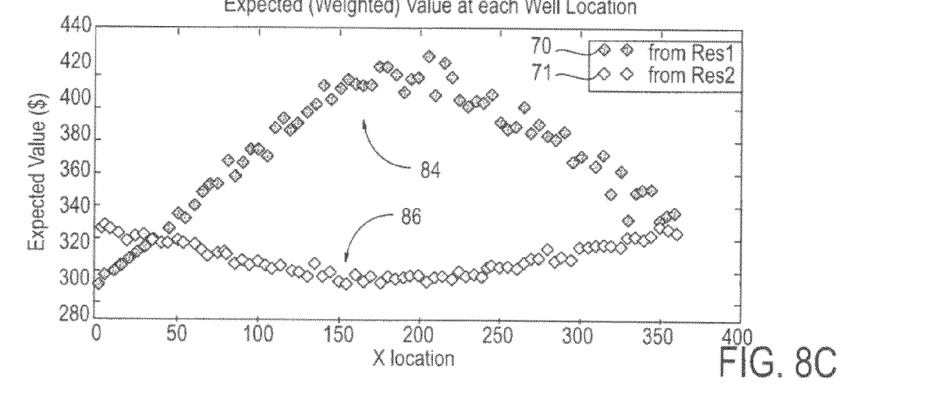
FIG. 8C shows a plot of the expected weighed value for each x location obtained for the first electrical resistivity and a plot of the expected weighed value for each x location obtained for the second electrical resistivity.

FIG. 8C shows a plot of the expected weighed value 84 for each x location obtained for the first electrical resistivity 70 and a plot of the expected weighed value 86 for each x location obtained for the second electrical resistivity 71, using equation (5). The two plots 84 and 86 show that the expected weighed value for the second electrical resistivity is less than the expected weighed value of the first electrical resistivity at around the mid-section of x-coordinated. However, at small x-locations (between about 0 and about 40), the expected weighed value for the second electrical resistivity becomes greater than the expected weighed value of the first electrical resistivity and at higher x-locations (between about 340 and about 360), the expected weighed value for the second electrical resistivity approaches the expected weighed value of the first electrical resistivity.

In one embodiment, the method or methods described above can be implemented as a series of instructions which can be executed by a computer. As it can be appreciated, the term "computer" is used herein to encompass any type of computing system or device including a personal computer (e.g., a desktop computer, a laptop computer, or any other handheld computing device), or a mainframe computer (e.g., an IBM mainframe), or a supercomputer (e.g., a CRAY computer), or a plurality of networked computers in a distributed computing environment.

For example, the method(s) may be implemented as a software program application which can be stored in a computer readable medium such as hard disks, CDROMs, optical disks, DVDs, magnetic optical disks, RAMs, EPROMs, EEPROMs, magnetic or optical cards, flash cards (e.g., a USB flash card), PCMCIA memory cards, smart cards, or other media Alternatively, a portion or the whole software program product can be downloaded from a remote computer or server via a network such as the internet, an ATM network, a wide area network (WAN) or a local area network.

Alternatively, instead or in addition to implementing the method as computer program product(s) (e.g., as software products) embodied in a computer, the method can be implemented as hardware in which for example an application specific integrated circuit (ASIC) can be designed to implement the method.

Figure 9:
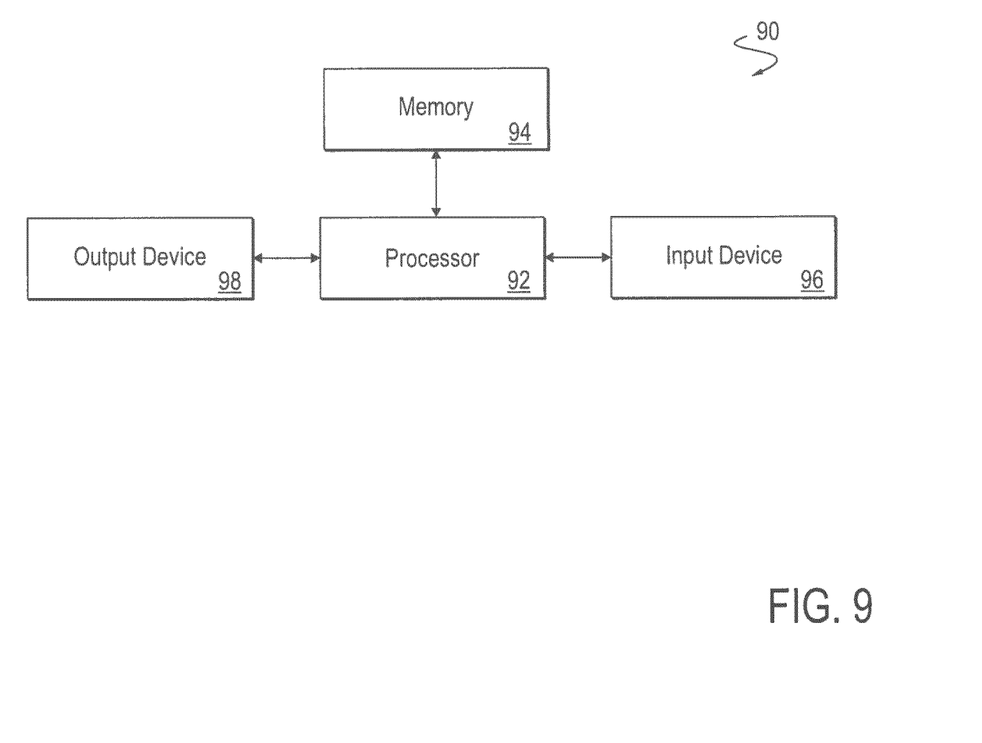
FIG. 9 is a schematic diagram representing a computer system 50 for implementing the method, according to an embodiment of the present invention.

FIG. 9 is a schematic diagram representing a computer system 90 for implementing the method, according to an embodiment of the present invention. As shown in FIG. 9, computer system 90 comprises a processor (e.g., one or more processors) 92 and a memory 94 in communication with the processor 92. The computer system 90 may further include an input device 96 for inputting data (such as keyboard, a mouse or the like) and an output device 98 such as a display device for displaying results of the computation.

As can be appreciated from the above description, the computer readable memory can be configured to store well locations and existing well data. The computer processor can be configured to: (a) draw a plurality of earth models from a posterior distribution, wherein the posterior distribution is generated by stochastic inversion of existing data; (b) calculate the well production at a plurality of proposed well locations within an earth model in the plurality of earth models using a relationship between the well production and earth parameters; (c) calculate from the plurality of earth models, cost distributions using the relationship between well cost and the earth parameters; and (d) calculate probability weighted values for the proposed well locations using probabilities from location dependent stochastic inversions as weights.

As can be further appreciated from the above description, the computer readable memory can be configured to store well locations and existing well data. The computer processor can be configured to: (a) draw a plurality of synthetic prior earth models from one or more prior distributions for a plurality of well locations and generate from each prior distribution synthetic data; (b) draw a plurality of posterior earth models from a posterior distribution for the plurality of well locations, wherein the posterior distribution is generated through stochastic inversion and the plurality of posterior models are drawn from each of the plurality of prior earth models; (c) calculate, from the plurality of prior earth models and posterior earth models, the well production at a plurality of proposed well locations using a relationship between the earth parameters and the well production for both the prior earth models and the posterior earth models; (d) calculate the prior well cost using a relationship between the prior well cost and the earth parameters and calculate a posterior well cost using a relationship between the posterior well cost and the earth parameters; (e) calculate a value prior using the prior cost and the prior production and calculate a value posterior using the posterior cost and the posterior production; (f) calculate a weighted prior value and calculate a weighted posterior value using, respectively, the value prior and the value posterior; and (g) calculate a difference or a ratio between the weighted value prior and the weighted value posterior and calculate a sum over a plurality of well locations of the difference or the ratio to obtain the value of information.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

Furthermore, since numerous modifications and changes will readily occur to those of skill in the art, it is not desired to limit the invention to the exact construction and operation described herein. Accordingly, all suitable modifications and equivalents should be considered as falling within the spirit and scope of the invention.

What is claimed is:

1. A computer implemented method for determining a value of information, the method comprising:
    drawing, by the computer, a plurality of synthetic prior earth models from one or more prior distributions for a plurality of well locations and generate from each prior distribution synthetic data;
    drawing, by the computer, a plurality of posterior earth models from a posterior distribution for the plurality of well locations, wherein the posterior distribution is generated through stochastic inversion from the synthetic data and the plurality of posterior models are drawn from each of the plurality of prior earth models;
    calculating, from the plurality of prior earth models and posterior earth models, a well production at a plurality of proposed well locations using a relationship between the earth parameters and the well production for both the prior earth models and the posterior earth models; calculating a prior well cost using a relationship between the prior well cost and the earth parameters and calculating a posterior well cost using a relationship between the posterior well cost and the earth parameters;
    calculating a value prior using the prior cost and the prior production and calculating a value posterior using the posterior cost and the posterior production;
    calculating a weighted prior value and calculating a weighted posterior value using, respectively, the value prior and the value posterior; and
    calculating a difference or a ratio between the weighted value prior and the weighted value posterior and calculating a sum over a plurality of well locations of the difference or the ratio to obtain the value of information.

2. The method according to claim 1, further comprising, prior to calculating the well production at a plurality of proposed well locations, deriving a relationship between well production and the earth parameters for both the prior models and the posterior models for one or more existing wells.

3. The method according to claim 2, wherein deriving the relationship between the well production and earth parameters comprises deriving the relationship from existing co-located production data and the earth parameters.

4. The method according to claim 1, further comprising, prior to calculating the prior well cost and calculating a posterior well cost, deriving the relationship between prior well cost and the prior earth parameters and deriving the relationship between posterior well cost and the posterior well parameters.

5. The method according to claim 4, wherein inputting the relationship between the prior well cost and the earth parameters or between the posterior well cost and the earth parameters comprises inputting a relationship wherein the cost depends essentially on depth parameters, on spatial variability, hardness of rock, or any combination thereof.

6. The method according to claim 1, wherein generating the posterior distribution using stochastic inversion comprises generating the posterior distribution using Markov Chain Monte Carlo techniques.

7. The method according to claim 1, wherein generating the posterior distribution using stochastic inversion comprises determining a probability of an earth model to occur given the existing data.

8. The method according to claim 1, wherein the earth parameters are selected from the group consisting of electrical resistivity, permeability, density, velocity, porosity, and depth.

9. The method according to claim 1, wherein calculating the value prior using the prior cost and the prior production comprises calculating a ratio between the prior production and the prior cost.

10. The method according to claim 1, wherein calculating the value posterior using the posterior cost and the posterior production comprises calculating a ratio between the posterior production and the posterior cost.

11. The method according to claim 1, wherein calculating a weighted prior value comprises multiplying the prior value by the one or more prior distributions, summing a product of the prior value by the one or more prior distributions over a number of prior earth models, and taking a maximum of the sum.

12. The method according to claim 1, wherein calculating a weighted posterior value comprises multiplying the posterior value by the one or more posterior distributions, summing a product of the posterior value by the one or more posterior distributions over a number of posterior models, taking a maximum of the sum to obtain a maximum value, multiplying the maximum value by the one or more prior distributions and summing the product of the maximum and the one or more prior distributions over a number of prior earth models.

13. A computer system for determining a value of information, the computer system comprising:
a computer readable memory configured to store well locations and existing well data; and
a processor in communication with the computer readable memory, the processor being configured to:
draw a plurality of synthetic prior earth models from one or more prior distributions for a plurality of well locations and generate from each prior distribution synthetic data;
draw a plurality of posterior earth models from a posterior distribution for the plurality of well locations, wherein the posterior distribution is generated through stochastic inversion from the synthetic data and the plurality of posterior models are drawn from each of the plurality of prior earth models;
calculate, from the plurality of prior earth models and posterior earth models, a well production at a plurality of proposed well locations using a relationship between the earth parameters and the well production for both the prior earth models and the posterior earth models; calculate a prior well cost using a relationship between the prior well cost and the earth parameters and calculate a posterior well cost using a relationship between the posterior well cost and the earth parameters;
calculate a value prior using the prior cost and the prior production and calculate a value posterior using the posterior cost and the posterior production;
calculate a weighted prior value and calculate a weighted posterior value using, respectively, the value prior and the value posterior; and
calculate a difference or a ratio between the weighted value prior and the weighted value posterior and calculate a sum over a plurality of well locations of the difference or the ratio to obtain the value of information.

14. The computer system according to claim 13, wherein the processor is further configured to derive a relationship between well production and the earth parameters for both the prior models and the posterior models for one or more existing wells.

15. The computer system according to claim 14, wherein the processor is further configured to derive the relationship from existing co-located production data and the earth parameters.

16. The computer system according to claim 13, wherein the processor is further configured to derive the relationship between prior well cost and the prior earth parameters and derive the relationship between posterior well cost and the posterior well parameters.

17. The computer system according to claim 16, wherein the processor is further configured to derive the relationship wherein the cost depends essentially on depth parameters, on spatial variability, hardness of rock, or any combination thereof.

18. The computer system according to claim 13, wherein the processor is further configured to generate the posterior distribution using Markov Chain Monte Carlo techniques.

19. The computer system according to claim 13, wherein the processor is further configured generate the posterior distribution using stochastic inversion comprises by determining a probability of an earth model to occur given the existing data.

20. The computer system according to claim 13, wherein the earth parameters are selected from the group consisting of electrical resistivity, permeability, density, porosity, and depth.

21. The computer system according to claim 13, wherein the processor is further configured to calculate a ratio between the prior production and the prior cost.

22. The computer system according to claim 13, wherein the processor is further configured to calculate a ratio between the posterior production and the posterior cost.

23. The computer system according to claim 13, wherein the processor is further configured to calculating a weighted prior value by multiplying the prior value by the one or more prior distributions, summing a product of the prior value by the one or more prior distributions over a number of prior earth models, and taking a maximum of the sum.

24. The computer system according to claim 13, wherein the processor is further configured to calculate a weighted posterior value by multiplying the posterior value by the one or more posterior distributions, summing a product of the posterior value by the one or more posterior distributions over a number of posterior models, taking a maximum of the sum to obtain a maximum value, multiplying the maximum value by the one or more prior distributions and summing the product of the maximum and the one or more prior distributions over a number of prior earth models.

* * * * *